United States Patent
Nakano et al.

(10) Patent No.: US 6,895,473 B2
(45) Date of Patent: May 17, 2005

(54) DATA CONTROL DEVICE AND AN ATM CONTROL DEVICE

(75) Inventors: Masao Nakano, Kanagawa (JP); Takeshi Toyoyama, Kanagawa (JP); Yasuhiro Ooba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 262 days.

(21) Appl. No.: 10/298,973

(22) Filed: Nov. 12, 2002

(65) Prior Publication Data

US 2003/0079091 A1 Apr. 24, 2003

Related U.S. Application Data

(63) Continuation of application No. PCT/JP00/03087, filed on May 12, 2000.

(51) Int. Cl.[7] .............................................. G06F 12/00
(52) U.S. Cl. ..................... 711/134; 711/118; 711/119; 711/120; 711/143; 711/167; 711/168; 711/169; 712/205; 712/206; 712/235; 370/395.7; 370/395.71; 370/395.72; 370/400
(58) Field of Search .................. 711/134, 118–120, 711/143, 167–169, 147–150; 712/205–206, 235; 370/395.7, 395.71–395.72, 400

(56) References Cited

U.S. PATENT DOCUMENTS

| 4,941,088 | A | | 7/1990 | Shaffer et al. | |
|---|---|---|---|---|---|
| 5,289,577 | A | * | 2/1994 | Gonzales et al. | 345/506 |
| 5,550,540 | A | | 8/1996 | Furlan et al. | |
| 5,592,628 | A | | 1/1997 | Ueno et al. | |
| 5,652,581 | A | | 7/1997 | Furlan et al. | |
| 6,088,800 | A | * | 7/2000 | Jones et al. | 713/189 |
| 6,279,088 | B1 | * | 8/2001 | Elliott et al. | 711/155 |
| 6,418,478 | B1 | * | 7/2002 | Ignatius et al. | 709/240 |
| 6,513,108 | B1 | * | 1/2003 | Kerr et al. | 712/19 |
| 6,564,304 | B1 | * | 5/2003 | Van Hook et al. | 711/154 |
| 6,606,326 | B1 | * | 8/2003 | Herring | 370/412 |
| 6,728,845 | B2 | * | 4/2004 | Adiletta et al. | 711/154 |
| 6,757,791 | B1 | * | 6/2004 | O'Grady et al. | 711/154 |

FOREIGN PATENT DOCUMENTS

| EP | 0 269 995 | 6/1988 |
|---|---|---|
| EP | 0 599 449 | 6/1994 |
| EP | 0 863 687 | 9/1998 |
| EP | 0 945 810 A2 | 9/1999 |
| JP | 61-233858 | 10/1986 |
| JP | 62-267833 | 11/1987 |
| JP | 63-238653 | 10/1988 |
| JP | 64-42741 | 2/1989 |
| JP | 4-76731 | 3/1992 |
| JP | 4-107634 | 4/1992 |
| JP | 4-346155 | 12/1992 |
| JP | 5-143287 | 6/1993 |
| JP | 5-227155 | 9/1993 |
| JP | 6-164574 | 6/1994 |
| JP | 6-259223 | 9/1994 |
| JP | 10-247912 | 9/1998 |
| JP | 11-272627 | 10/1999 |
| JP | 2000-228664 | 8/2000 |

* cited by examiner

Primary Examiner—Matthew Anderson
Assistant Examiner—Zhuo H. Li
(74) Attorney, Agent, or Firm—Katten Muchin Zavis Rosenman

(57) ABSTRACT

A data control device capable of high-quality, high-efficiency control for speeding up data processing, thus permitting improvement of the throughput of a system. Attribute analyzing unit analyzes an attribute of data, and a main memory stores setting information of the data in a region corresponding to the attribute. A highway cache memory stores the data, and also receives and transmits the data on a highway. A processor performs an operation on the data in accordance with the setting information. A data cache memory is interposed between the processor and the main memory and stores the setting information.

18 Claims, 11 Drawing Sheets

DATA CONTROL DEVICE AND AN ATM CONTROL DEVICE

This application is a continuing application, filed under 35 U.S.C. §111(a), of International Application PCT/JP00/03087, filed May 12, 2000.

BACKGROUND OF THE INVENTION

(1) Field of the Invention

The present invention relates to a data control device and an ATM (Asynchronous Transfer Mode) control device, and more particularly, to a data control device for controlling operations on data and an ATM control device for controlling ATM communications.

(2) Description of the Related Art

Conventionally, a data communication system includes a processor (CPU) for performing operations and a memory (or registers) for storing data. The processor controls access to the memory and executes operations.

As a technique of performing such operations, pipeline processing in which a plurality of instructions are processed in an overlapped fashion is widely used to improve the throughput of the system.

FIG. 11 illustrates a flow of operations by means of a conventional pipeline, wherein the relationship between the occurrences of events and operations performed by the processor is indicated in time sequence of pipelining.

[S10] Following the occurrence of an event A, attribute analysis (analysis of data access range, etc.) of data related to the event A is carried out.

[S11] In response to the occurrence of an event B, the attribute analysis of data related to the event B is performed. Further, the data related to the event A is read from memory.

[S12] In response to the occurrence of an event C, the attribute analysis of data related to the event C is carried out. Also, the data related to the event B is read from memory. Further, operation on the data related to the event A is performed.

[S13] The data related to the event C is read from memory, and also operation on the data related to the event B is performed. Further, the data related to the event A is written in memory.

Subsequently, processes are performed in the order illustrated in the figure. Pipeline processing like this makes it possible to improve the apparent efficiency of processing instructions.

With the above conventional pipeline processing, however, the processor needs to analyze the attribute of data before performing a series of processes including memory read, operation, and memory write. Consequently, the data access time correspondingly increases, lowering the efficiency.

Also, in the conventional pipeline processing, if different instructions simultaneously require read access and write access, respectively, to an identical address of the memory (e.g. if in Step S13, the memory read responsive to the event C and the memory write responsive to the event A require access to the same address), then a pipeline hazard occurs, giving rise to a problem that the pipeline temporarily stops.

On the other hand, where the required logic for controlling the execution of instructions, like the one mentioned above, is implemented by a hard-wired configuration using a linear sequential circuit, instead of a processor, with a view to attaining high-speed processing, the hardware needs to be redesigned when even a slight change is made to the standard or to the design specification and thus lacks flexibility.

SUMMARY OF THE INVENTION

The present invention was created in view of the above circumstances, and an object thereof is to provide a data control device which is capable of high-quality, high-efficiency control for speeding up data processing and thus can improve the throughput of a system.

Another object of the present invention is to provide an ATM control device which is capable of high-quality, high-efficiency control for speeding up cell processing and thus can improve the throughput of an ATM system.

To achieve the first object, there is provided a data control device for controlling operations on data. The data control device comprises attribute analyzing means for analyzing an attribute of data, a main memory for storing setting information of the data in a region corresponding to the attribute, and a plurality of data processing means each including a highway cache memory for storing the data, the highway cache memory receiving and transmitting the data on a highway, a processor for performing an operation on the data in accordance with the setting information, and a data cache memory interposed between the processor and the main memory and storing the setting information, the plurality of data processing means subjecting the data to a plurality of stages of pipeline processing.

To achieve the second object, there is provided an ATM control device for controlling ATM communications. The ATM control device comprises attribute analyzing means for analyzing an attribute of a cell, a main memory for storing setting information of the cell in a region corresponding to the attribute, and a plurality of cell processing means each including a highway cache memory for storing the cell, the highway cache memory receiving and transmitting the cell on a highway, a processor for performing an operation on the cell in accordance with the setting information, and a cell cache memory interposed between the processor and the main memory and storing the setting information, the plurality of cell processing means subjecting the cell to a plurality of stages of pipeline processing.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
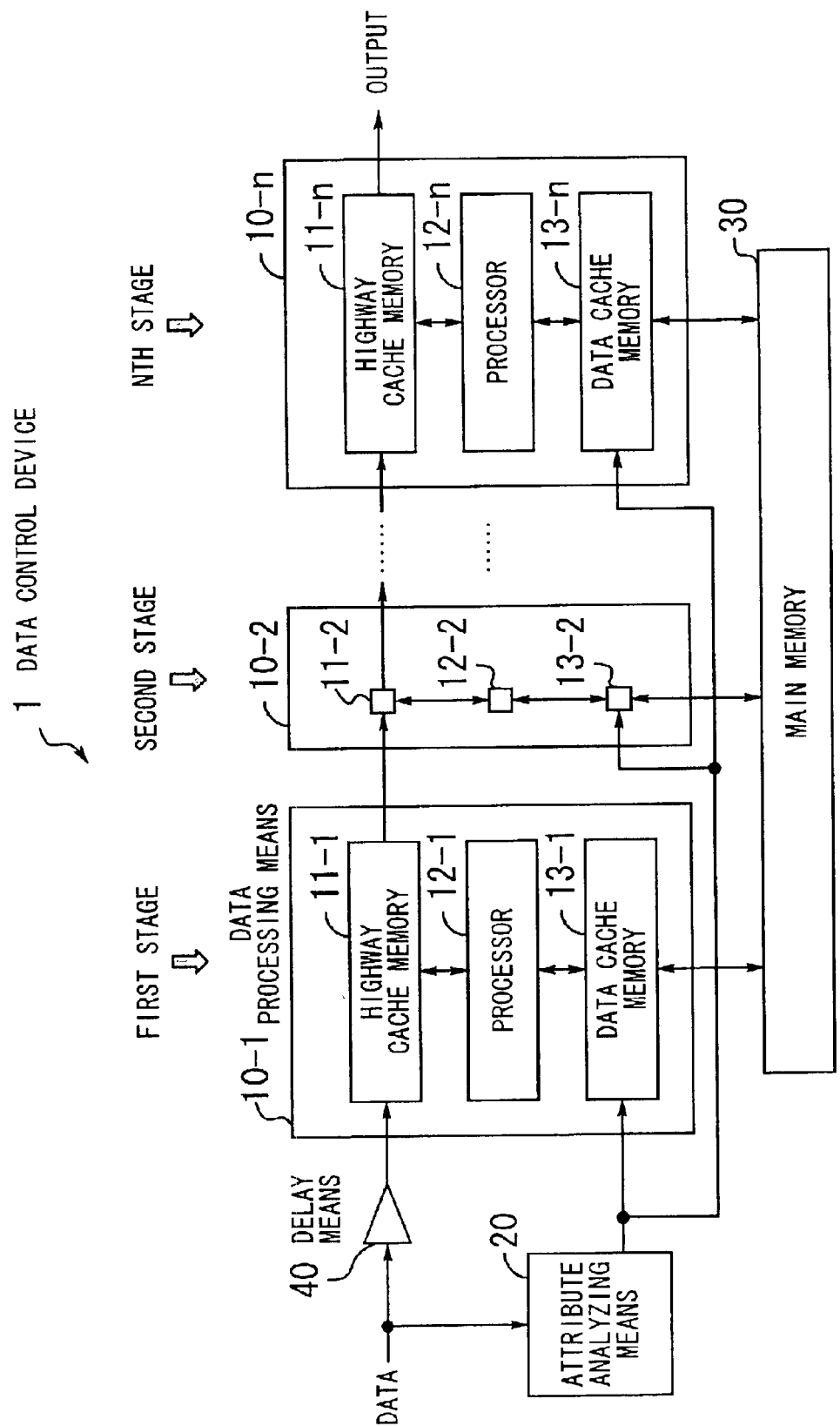
FIG. 1 is a diagram illustrating the principle of a data control device according to the present invention.

Embodiments of the present invention will be hereinafter described with reference to the drawings. FIG. 1 illustrates the principle of a data control device according to the present invention. The data control device 1 comprises data processing means 10-1 to 10-n, attribute analyzing means 20, a main memory 30 and delay means 40, and controls operations on data.

The attribute analyzing means 20 analyzes an attribute of data. The attribute analysis represents analysis of data access range etc., and the attribute denotes destination address of data, etc.

The main memory 30 stores setting information of the data in a region corresponding to the attribute (destination address). The setting information is, for example, operand data etc. used in the operation on the data.

The data processing means 10-1 to 10-n comprise highway cache memories 11-1 to 11-n, processors 12-1 to 12-n and data cache memories 13-1 to 13-n, respectively, and subject each of data to a plurality of stages (first stage to Nth stage) of pipeline processing.

The highway cache memories 11-1 to 11-n store data and also receive and transmit data on a highway (or bus). The processors 12-1 to 12-n each perform an operation on the data in accordance with the setting information. The data cache memories 13-1 to 13-n are each interposed between a corresponding one of the processors 12-1 to 12-n and the main memory 30 and stores the setting information.

Also, the data cache memories 13-1 to 13-n are each constituted by read means, operation information storage means and write-back means, which carry out parallel processing independently of one another.

The read means reads the setting information from the main memory 30 and stores same. The operation information storage means, which is a part accessed by a corresponding one of the processors 12-1 to 12-n, stores the setting information as well as the result of operation. The write-back means writes the operation result back into the main memory 30 as the setting information. Details of the operation will be described later with reference to FIG. 3 and the subsequent figures.

The delay means 40 delays data for a time period required by the attribute analyzing means 20 to analyze the attribute of the data, and supplies the thus-delayed data to the data processing means 10-1.

Figure 2:
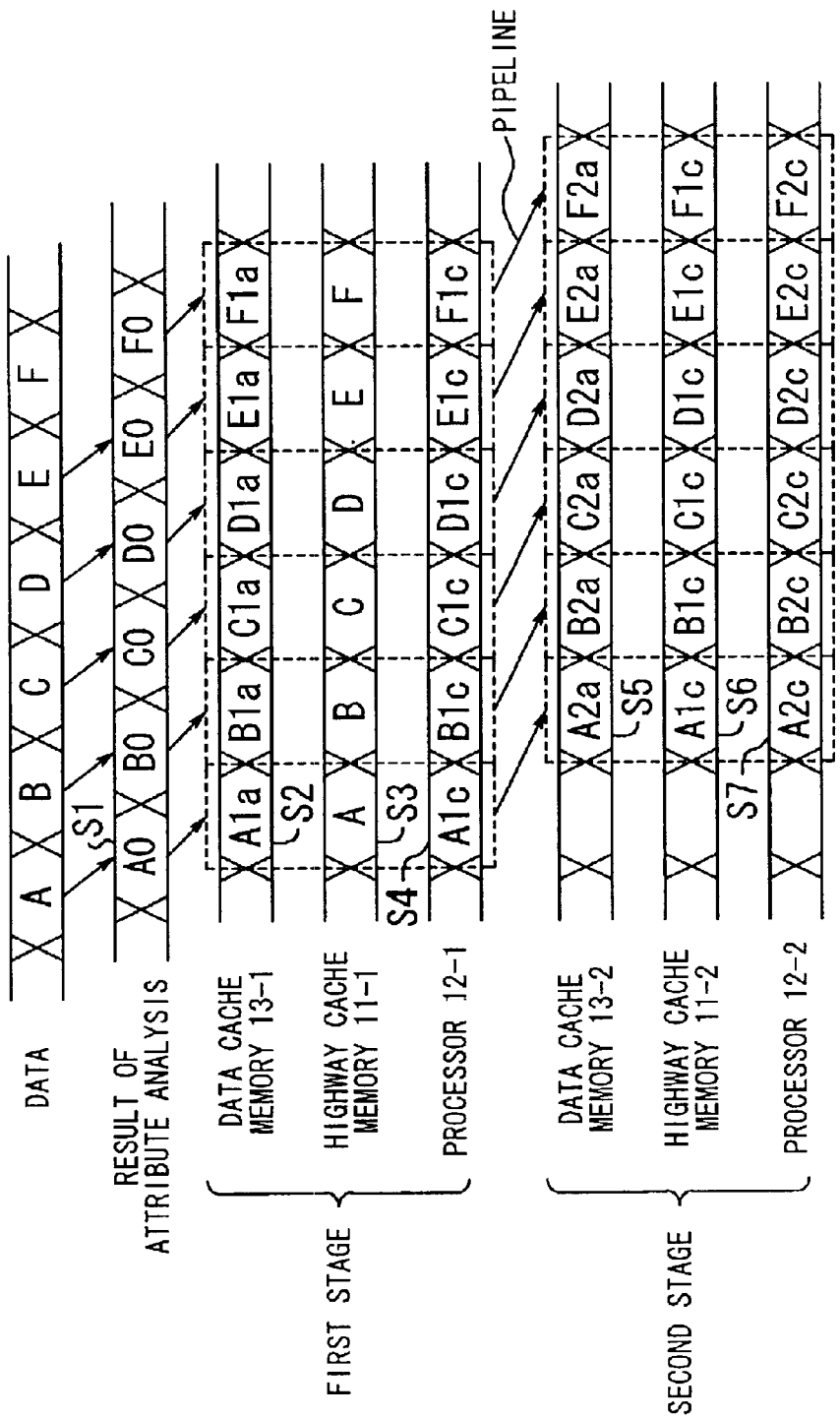
FIG. 2 is a time chart illustrating operation of the data control device.

The operation will be now described. FIG. 2 is a time chart illustrating the operation of the data control device 1. The following explains how data A is processed in the case where data A, B, . . . are received.

[S1] The attribute analyzing means 20 analyzes the attribute of the data A and sends the analysis result A0 to the data processing means 10-1 to 10-n.

[S2] The data cache memory 13-1 reads first stage-related setting information A1a of the data A from the main memory 30 and stores same.

[S3] The highway cache memory 11-1 receives the data A delayed by the delay means 40 and stores same.

[S4] Using the setting information A1a in the data cache memory 13-1, the processor 12-1 performs a first-stage operation on the data A stored in the highway cache memory 11-1.

Data A1c obtained as a result of the operation is sent via the highway cache memory 11-1 to the highway cache memory 11-2 of the succeeding stage. Further, the data A1c is written via the data cache memory 13-1 back into the main memory 30.

[S5] The data cache memory 13-2 reads second stage-related setting information A2a of the data A from the main memory 30 and stores same.

[S6] The highway cache memory 11-2 receives the data A1c output from the data cache memory 13-1 and stores same.

[S7] Using the setting information A2a in the data cache memory 13-2, the processor 12-2 performs a second-stage operation on the data A1c stored in the highway cache memory 11-2.

Data A2c obtained as a result of the operation is sent via the highway cache memory 11-2 to the highway cache memory 11-3 of the succeeding stage. Further, the data A2c is written via the data cache memory 13-2 into the main memory 30. The data A is thereafter sequentially processed in like manner through the pipeline up to the Nth stage, whereupon the operation on the data A is completed.

Thus, in the data control device 1 of the present invention, after the attribute of data is analyzed, the data is subjected to a plurality of stages of pipeline processing by means of a multiprocessor system, namely, the multiple data processing means 10-1 to 10-n comprising the highway cache memories 11-1 to 11-n, the processors 12-1 to 12-n and the data cache memories 13-1 to 13-n, respectively.

This permits a series of processes to be performed as soon as the attribute of data is analyzed, so that the data access time can be shortened. Also, since the pipeline processing is implemented by a multiprocessor system, the system can flexibly cope with change of design specification etc. and enables high-efficiency, high-speed processing.

The following describes a case where the data control device 1 of the present invention is applied to an ATM control device for controlling ATM communications. The ATM control device performs, for example, a process of counting the number of cells, a statistical process for the management of OAM (Operation And Maintenance) performance, an accounting process or the like.

The configuration of the ATM control device is basically identical with that of the data control device 1 explained above with reference to FIG. 1, wherein the data corresponds to a cell, the data cache memory corresponds to a cell cache memory, and the data processing means corresponds to cell processing means.

Figure 3:
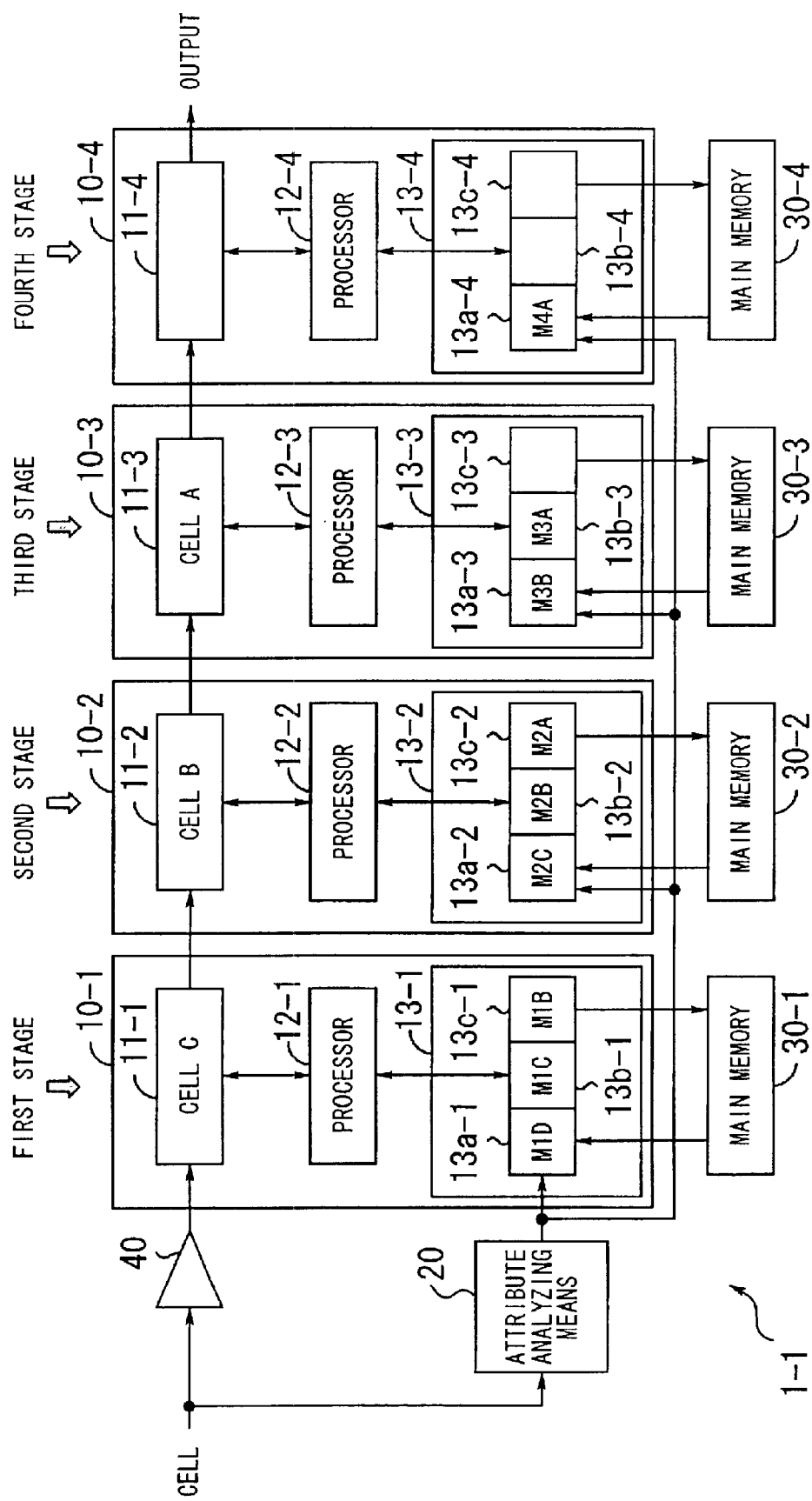
FIG. 3 is a diagram illustrating operation of an ATM control device according to a first embodiment.

FIG. 3 illustrates operation of an ATM control device according to a first embodiment. The figure shows a state at time t, and a cell is passed through four stages, whereupon the processing of the cell is completed. Also, after a lapse of a processing time for one stage, the cell and the setting information shift to right by one stage.

The ATM control device 1-1 comprises cell processing means 10-1 to 10-4, attribute analyzing means 20, main memories 30-1 to 30-4, and delay means 40.

In the first embodiment, independent main memories are provided for the respective stages. The illustrated example has four stages, and accordingly, the four main memories 30-1 to 30-4 are provided.

The cell processing means 10-1 to 10-4 comprise highway cache memories 11-1 to 11-4, processors 12-1 to 12-4, and cell cache memories 13-1 to 13-4, respectively.

The cell cache memories 13-1 to 13-4 are constituted by read means 13a-1 to 13a-4, operation information storage means 13b-1 to 13b-4 and write-back means 13c-1 to 13c-4, respectively.

In the following, it is assumed that cells A, B, C and D arrive in the order mentioned. Also, the setting information stored in the cell cache memories 13-1 to 13-4 is indicated by M∘Δ, where ∘ indicates the stage number and Δ indicates the cell identifier (A–D). For example, "M1D" indicates the setting information of the cell D used in the first-stage process.

Operations of the individual stages will be now described. First, in the first stage, the cell C is stored in the highway cache memory 11-1. The processor 12-1 performs a first-stage operation on the cell C stored in the highway cache memory 11-1, by using the setting information M1C stored in the operation information storage means 13b-1. The operation information storage means 13b-1 stores the result of operation. The result of operation on the cell C is also sent via the highway cache memory 11-1 to the next stage.

The read means 13a-1 reads, from the main memory 30-1, the setting information M1D which is to be subjected to operation at the time (t+1 stage processing time). The write-back means 13c-1 writes the operation result M1B, which was obtained by the operation at the time (t−1 stage processing time), back into the main memory 30-1 as the setting information.

The state at the time (t+1 stage processing time) denotes the next processing state in which the cells are shifted to right by one stage from the state at the time t, and the state at the time (t−1 stage processing time) denotes the preceding processing state which is one rightward shift operation before the state at the time t.

In the second stage, the cell B (which has already been subjected to operation in the first stage) is stored in the highway cache memory 11-2. Using the setting information M2B stored in the operation information storage means 13b-2, the processor 12-2 performs a second-stage operation on the cell B stored in the highway cache memory 11-2. The operation information storage means 13b-2 stores the result of operation. Also, the result of operation on the cell B is sent via the highway cache memory 11-2 to the succeeding stage.

The read means 13a-2 reads, from the main memory 30-2, the setting information M2C which is to be subjected to operation at the time (t+1 stage processing time). The write-back means 13c-2 writes the operation result M2A, which was obtained by the operation at the time (t−1 stage processing time), back into the main memory 30-2 as the setting information.

In the third stage, the cell A (which has already been subjected to operation in the first and second stages) is stored in the highway cache memory 11-3. The processor 12-3 performs a third-stage operation on the cell A stored in the highway cache memory 11-3, by using the setting information M3A stored in the operation information storage means 13b-3. The operation information storage means 13b-3 stores the result of operation. Also, the result of operation on the cell A is sent via the highway cache memory 11-3 to the next stage.

The read means 13a-3 reads, from the main memory 30-3, the setting information M3B which is to be subjected to operation at the time (t+1 stage processing time). At this point of time, the write-back means 13c-3 has no setting information to write back.

In the fourth stage, no cell has arrived at the highway cache memory 11-4 yet. The setting information M4A which is to be subjected to operation at the time (t+1 stage processing time) is read from the main memory 30-4 by the read means 13a-4. At this point of time, the operation information storage means 13b-4 and the write-back means 13c-4 have no setting information therein.

Figure 4:
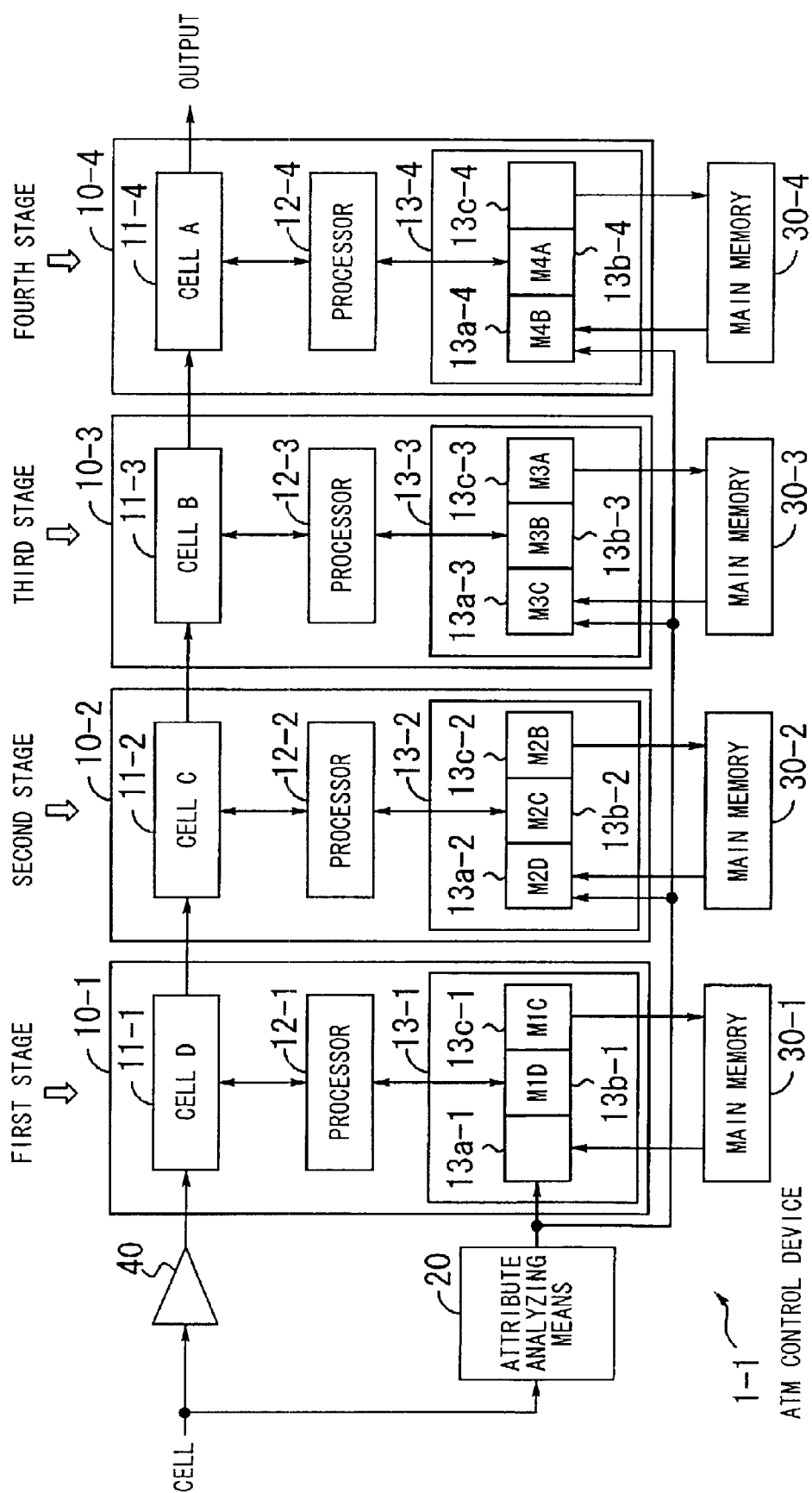
FIG. 4 is a diagram also illustrating the operation of the ATM control device according to the first embodiment.

FIG. 4 also illustrates the operation of the ATM control device according to the first embodiment, in which is shown the state at the time (t+1 stage processing time) In the first stage, the cell D is stored in the highway cache memory 11-1. The processor 12-1 performs the first-stage operation on the cell D stored in the highway cache memory 11-1, by using the setting information M1D stored in the operation information storage means 13b-1. The operation information storage means 13b-1 stores the result of operation. The result of operation on the cell D is also sent via the highway cache memory 11-1 to the next stage.

The read means 13a-1 reads, from the main memory 30-1, the setting information which is to be subjected to operation at the time (t+2 stage processing times). The write-back means 13c-1 writes the operation result M1C, which was obtained by the operation at the time t, back into the main memory 30-1 as the setting information.

In the second stage, the cell C (which has already been subjected to operation in the first stage) is stored in the highway cache memory 11-2. Using the setting information M2C stored in the operation information storage means 13b-2, the processor 12-2 performs the second-stage operation on the cell C stored in the highway cache memory 11-2. The operation information storage means 13b-2 stores the result of operation. Also, the result of operation on the cell C is sent via the highway cache memory 11-2 to the succeeding stage.

The read means 13a-2 reads, from the main memory 30-2, the setting information M2D which is to be subjected to operation at the time (t+2 stage processing times). The write-back means 13c-2 writes the operation result M2B, which was obtained by the operation at the time t, back into the main memory 30-2 as the setting information.

In the third stage, the cell B (which has already been subjected to operation in the first and second stages) is stored in the highway cache memory 11-3. The processor 12-3 performs the third-stage operation on the cell B stored in the highway cache memory 11-3, by using the setting information M3B stored in the operation information storage means 13b-3. The operation information storage means 13b-3 stores the result of operation. Also, the result of operation on the cell B is sent via the highway cache memory 11-3 to the next stage.

The read means 13a-3 reads, from the main memory 30-3, the setting information M3C which is to be subjected to operation at the time (t+2 stage processing times). The write-back means 13c-3 writes the operation result M3A, which was obtained by the operation at the time t, back into the main memory 30-3 as the setting information.

In the fourth stage, the cell A (which has already been subjected to operation in the first, second and third stages) is stored in the highway cache memory 11-4. The processor 12-4 performs a fourth-stage operation on the cell A stored in the highway cache memory 11-4, by using the setting information M4A stored in the operation information storage means 13b-4. The operation information storage means 13b-4 stores the result of operation. Also, the result of final operation on the cell A is output via the highway cache memory 11-4.

The read means 13a-4 reads, from the main memory 30-4, the setting information M4B which is to be subjected to operation at the time (t+2 stage processing times). At this point of time, the write-back means 13c-4 has no setting information to write back.

As described above, the ATM control device 1-1 of the present invention is configured such that, when operation is performed at the time t in the individual stages, the process of the operation information storage means 13b-1 to 13b-4, the read process of the read means 13a-1 to 13a-4 for the setting information to be subjected to operation at the time (t+1 stage processing time) and the write-back process of the write-back means 13c-1 to 13c-4 for the setting information obtained by the operation at the time (t−1 stage processing time) are executed in parallel with one another.

This permits high-quality, high-efficiency control for speeding up the cell processing, making it possible to improve the throughput of the system.

Also, the main memories 30-1 to 30-4 are provided for the respective stages independently of one another so that the processing may be completed in the individual stages. Accordingly, the disadvantage that different instructions simultaneously require read access and write access, respectively, to an identical address can be eliminated, whereby pipeline hazard can be prevented.

Figure 5:
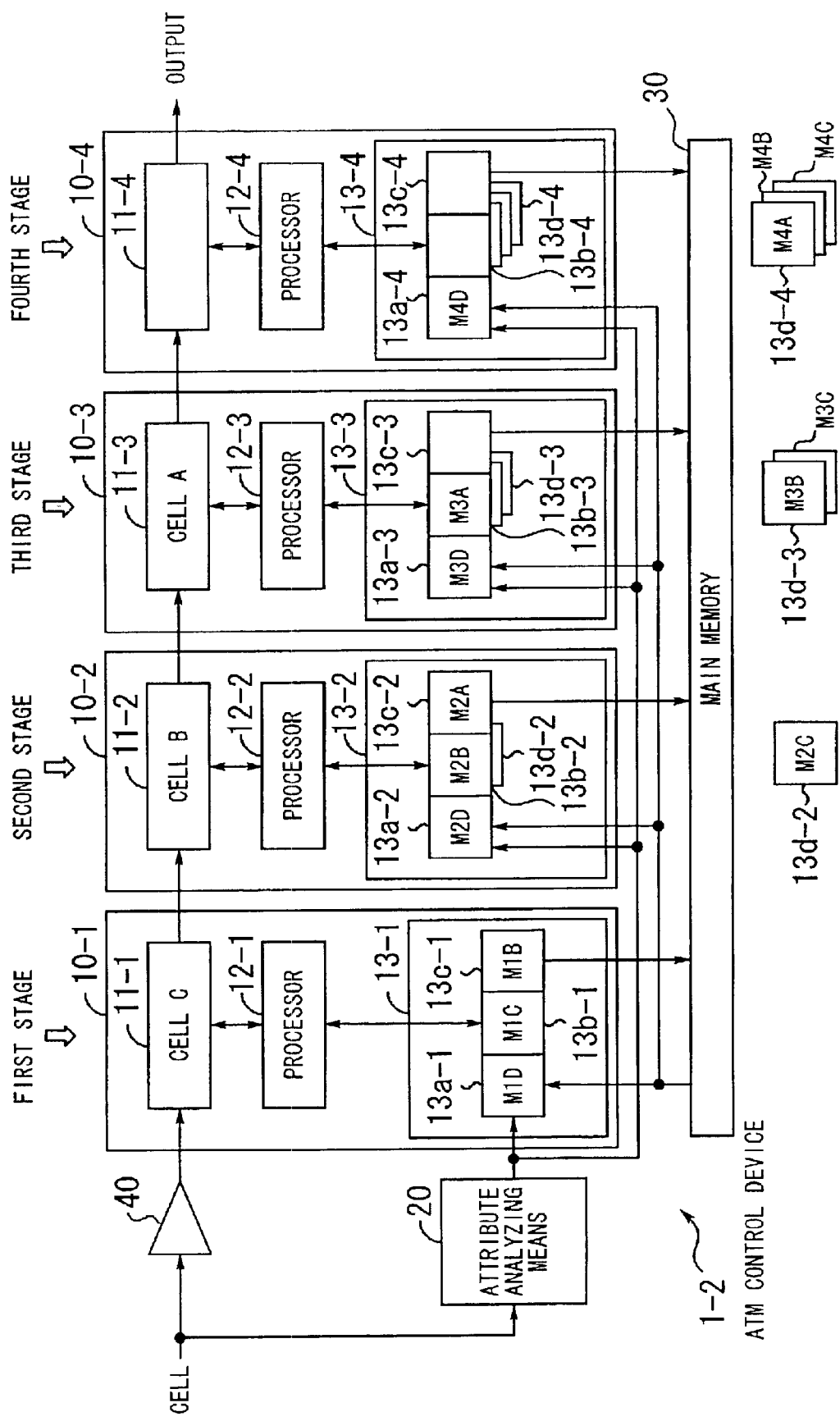
FIG. 5 is a diagram illustrating operation of an ATM control device according to a second embodiment.

An ATM control device according to a second embodiment will be now described. FIG. 5 illustrates operation of the ATM control device according to the second embodiment, in which is shown the state at time t.

In the illustrated configuration of the ATM control device 1-2, the main memories 30-1 to 30-4 of the ATM control device 1-1 shown in FIGS. 3 and 4 are replaced by a main memory 30. Also, the cell cache memories 13-2 to 13-4 include setting information storage means 13d-2 to 13d-4, respectively.

Operations of the individual stages will be now described. In the first stage, the cell C is stored in the highway cache memory 11-1. The processor 12-1 performs the first-stage operation on the cell C stored in the highway cache memory 11-1, by using the setting information M1C stored in the operation information storage means 13b-1. The operation information storage means 13b-1 stores the result of operation. The result of operation on the cell C is also sent via the highway cache memory 11-1 to the next stage.

The read means 13a-1 reads, from the main memory 30, the setting information M1D which is to be subjected to operation at the time (t+1 stage processing time). The write-back means 13c-1 writes the operation result M1B, which was obtained by the operation at the time (t−1 stage processing time), back into the main memory 30 as the setting information.

In the second stage, the cell B (which has already been subjected to operation in the first stage) is stored in the highway cache memory 11-2. Using the setting information M2B stored in the operation information storage means 13b-2, the processor 12-2 performs the second-stage operation on the cell B stored in the highway cache memory 11-2. The operation information storage means 13b-2 stores the result of operation. Also, the result of operation on the cell B is sent via the highway cache memory 11-2 to the succeeding stage.

The read means 13a-2 reads, from the main memory 30, the setting information M2D which is to be subjected to operation at the time (t+2 stage processing times). The write-back means 13c-2 writes the operation result M2A, which was obtained by the operation at the time (t−1 stage processing time), back into the main memory 30 as the setting information.

Also, the setting information storage means 13d-2 stores the setting information M2C which is to be subjected to operation at the time (t+1 stage processing time).

In the third stage, the cell A (which has already been subjected to operation in the first and second stages) is stored in the highway cache memory 11-3. The processor 12-3 performs the third-stage operation on the cell A stored in the highway cache memory 11-3, by using the setting information M3A stored in the operation information storage means 13b-3. The operation information storage means 13b-3 stores the result of operation. Also, the result of operation on the cell A is sent via the highway cache memory 11-3 to the next stage.

The read means 13a-3 reads, from the main memory 30, the setting information M3D which is to be subjected to operation at the time (t+3 stage processing times). At this point of time, the write-back means 13c-3 has no setting information to write back.

The setting information storage means 13d-3 stores the setting information M3B which is to be subjected to operation at the time (t+1 stage processing time) as well as the setting information M3C which is to be subjected to operation at the time (t+2 stage processing times).

In the fourth stage, no cell has arrived at the highway cache memory 11-4 yet. The setting information M4D which is to be subjected to operation at the time (t+4 stage processing times) is read from the main memory 30 by the read means 13a-4. At this point of time, the operation information storage means 13b-4 and the write-back means 13c-4 have no setting information therein.

The setting information storage means 13d-4 stores the setting information M4A which is to be subjected to operation at the time (t+1 stage processing time), the setting information M4B which is to be subjected to operation at the time (t+2 stage processing times), and the setting information M4C which is to be subjected to operation at the time (t+3 stage processing times).

Figure 6:
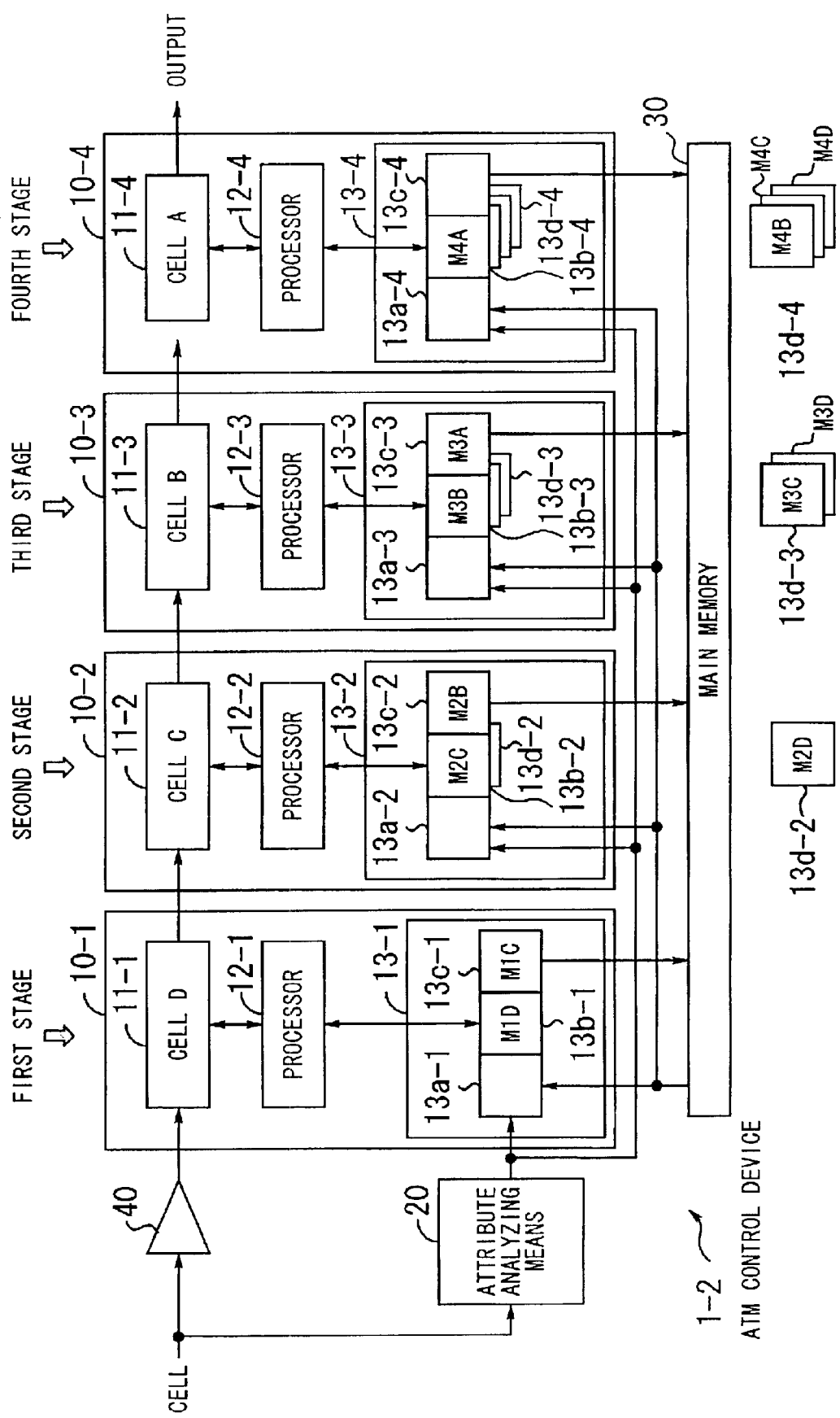
FIG. 6 is a diagram also illustrating the operation of the ATM control device according to the second embodiment.

FIG. 6 also illustrates the operation of the ATM control device according to the second embodiment, in which is shown the state at the time (t+1 stage processing time) In the first stage, the cell D is stored in the highway cache memory 11-1. The processor 12-1 performs the first-stage operation on the cell D stored in the highway cache memory 11-1, by using the setting information M1D stored in the operation information storage means 13b-1. The operation information storage means 13b-1 stores the result of operation. The result of operation on the cell D is also sent via the highway cache memory 11-1 to the next stage.

The read means 13a-1 reads, from the main memory 30, the setting information which is to be subjected to operation at the time (t+2 stage processing times). The write-back means 13c-1 writes the operation result M1C, which was obtained by the operation at the time t, back into the main memory 30 as the setting information.

In the second stage, the cell C (which has already been subjected to operation in the first stage) is stored in the highway cache memory 11-2. Using the setting information M2C stored in the operation information storage means 13b-2, the processor 12-2 performs the second-stage operation on the cell C stored in the highway cache memory 11-2. The operation information storage means 13b-2 stores the result of operation. Also, the result of operation on the cell C is sent via the highway cache memory 11-2 to the succeeding stage.

The read means 13a-2 reads, from the main memory 30, the setting information which is to be subjected to operation at the time (t+3 stage processing times). The write-back means 13c-2 writes the operation result M2B, which was obtained by the operation at the time t, back into the main memory 30 as the setting information.

The setting information storage means 13d-2 stores the setting information M2D which is to be subjected to operation at the time (t+2 stage processing times).

In the third stage, the cell B (which has already been subjected to operation in the first and second stages) is stored in the highway cache memory 11-3. The processor 12-3 performs the third-stage operation on the cell B stored in the highway cache memory 11-3, by using the setting information M3B stored in the operation information storage means 13b-3. The operation information storage means 13b-3 stores the result of operation. Also, the result of operation on the cell B is sent via the highway cache memory 11-3 to the next stage.

The read means 13a-3 reads, from the main memory 30, the setting information which is to be subjected to operation at the time (t+4 stage processing times). The write-back means 13c-3 writes the operation result M3A, which was obtained by the operation at the time t, back into the main memory 30 as the setting information.

The setting information storage means 13d-3 stores the setting information M3C which is to be subjected to operation at the time (t+2 stage processing times) and the setting information M3D which is to be subjected to operation at the time (t+3 stage processing times).

In the fourth stage, the cell A (which has already been subjected to operation in the first, second and third stages) is stored in the highway cache memory 11-4. The processor 12-4 performs the fourth-stage operation on the cell A stored in the highway cache memory 11-4, by using the setting information M4A stored in the operation information storage means 13b-4. The operation information storage means 13b-4 stores the result of operation. Also, the result of final operation on the cell A is output via the highway cache memory 11-4.

The read means 13a-4 reads, from the main memory 30, the setting information which is to be subjected to operation at the time (t+5 stage processing times). At this point of time, the write-back means 13c-4 has no setting information to write back.

The setting information storage means 13d-4 stores the setting information M4B which is to be subjected to operation at the time (t+2 stage processing times), the setting information M4C which is to be subjected to operation at the time (t+3 stage processing times), and the setting information M4D which is to be subjected to operation at the time (t+4 stage processing times).

As described above, the ATM control device 1-2 of the present invention is configured such that, when operation is performed at the time t in the Nth (N≧1) stage, the process of the operation information storage means 13b-1–13b-4, the read process of the read means 13a1–13a-4 for the setting information to be subjected to operation at the time (t+N stage processing times) and the write-back process of the write-back means 13c-1–13c-4 for the setting information obtained by the operation at the time (t−1 stage processing time) are executed in parallel with one another.

Also, the ATM control device is configured such that, when operation is performed at the time t in the Nth (N≧2) stage, the setting information storage means stores the setting information to be subjected to operation at the time (t+1 stage processing time) through the setting information to be subjected to operation at the time (t+(N−1) stage processing times).

This permits high-quality, high-efficiency control for speeding up the cell processing, making it possible to improve the throughput of the system.

Figure 7:
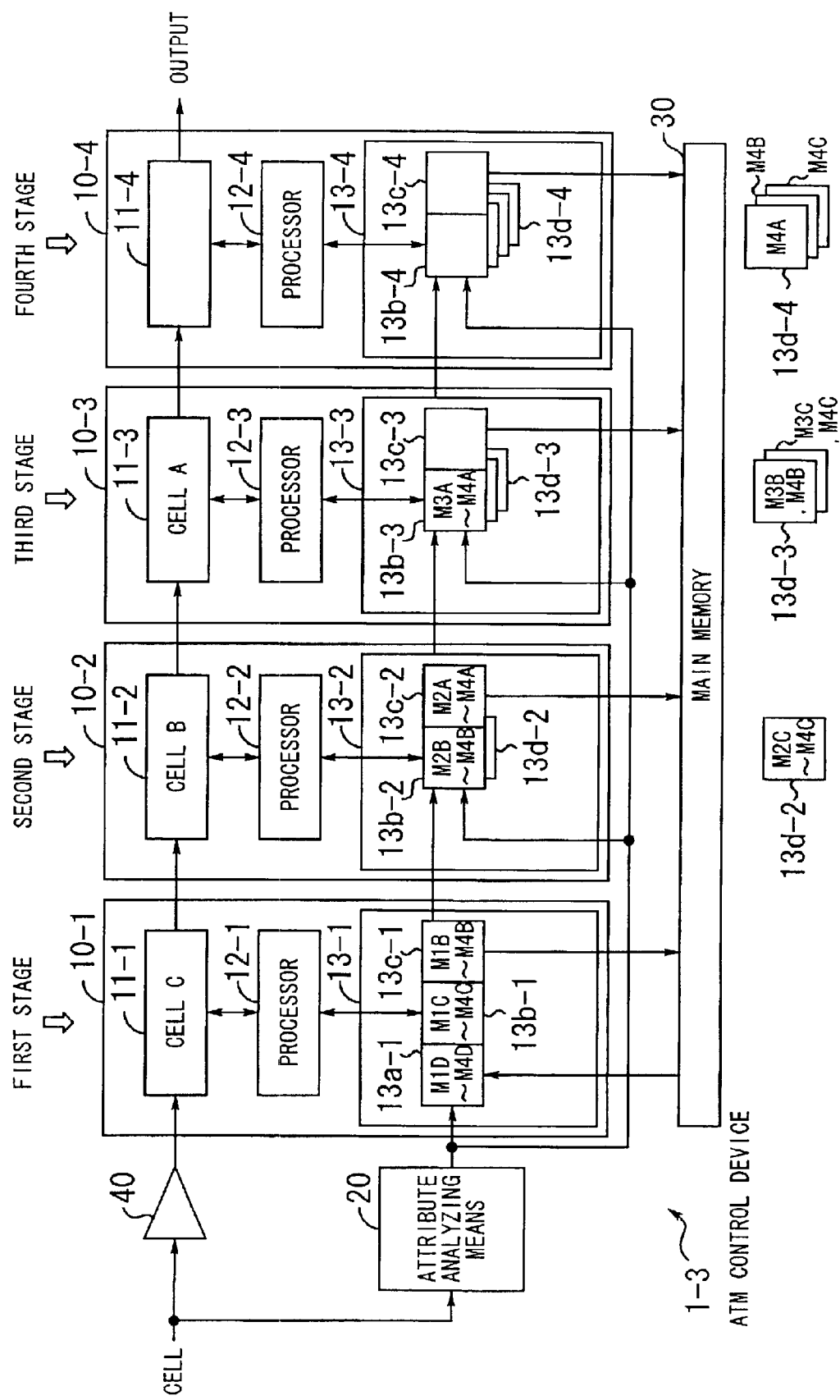
FIG. 7 is a diagram illustrating operation of an ATM control device according to a third embodiment.

An ATM control device according to a third embodiment will be now described. FIG. 7 illustrates operation of the ATM control device according to the third embodiment, in which is shown the state at time t.

Compared with the ATM control device 1-2 explained above with reference to FIGS. 5 and 6, the ATM control device 1-3 is configured such that the cell cache memories 13-2 to 13-4 include no read means.

Operations of the individual stages will be now described. In the first stage, the cell C is stored in the highway cache memory 11-1. The processor 12-1 performs the first-stage operation on the cell C stored in the highway cache memory 11-1, by using the setting information M1C stored in the operation information storage means 13b-1. The operation information storage means 13b-1 stores the result of operation. The result of operation on the cell C is also sent via the highway cache memory 11-1 to the next stage.

The read means 13a-1 collectively reads the setting information M1D through the setting information M4D from the main memory 30. The write-back means 13c-1 writes the operation result M1B, which was obtained by the operation at the time (t−1 stage processing time), back into the main memory 30 as the setting information. Also, the cell cache memory 13-1 sends the setting information M2C to M4C to the cell cache memory 13-2.

In the second stage, the cell B (which has already been subjected to operation in the first stage) is stored in the highway cache memory 11-2. Using the setting information M2B stored in the operation information storage means 13b-2, the processor 12-2 performs the second-stage operation on the cell B stored in the highway cache memory 11-2. The operation information storage means 13b-2 stores the result of operation. Also, the result of operation on the cell B is sent via the highway cache memory 11-2 to the succeeding stage.

The write-back means 13c-2 writes the operation result M2A, which was obtained by the operation at the time (t−1 stage processing time), back into the main memory 30 as the setting information. Also, the setting information storage means 13d-2 stores the setting information M2C to M4C. Further, the cell cache memory 13-2 sends the setting information M3C and M4C to the cell cache memory 13-3.

In the third stage, the cell A (which has already been subjected to operation in the first and second stages) is stored in the highway cache memory 11-3. The processor 12-3 performs the third-stage operation on the cell A stored in the highway cache memory 11-3, by using the setting information M3A stored in the operation information storage means 13b-3. The operation information storage means 13b-3 stores the result of operation. Also, the result of operation on the cell A is sent via the highway cache memory 11-3 to the next stage.

At this point of time, the write-back means 13c-3 has no setting information to write back. The setting information storage means 13d-3 stores the setting information M3B and M4B and the setting information M3C and M4C. Also, the cell cache memory 13-3 sends the setting information M4B and M4C to the cell cache memory 13-4.

In the fourth stage, no cell has arrived at the highway cache memory 11-4 yet. At this point of time, the operation information storage means 13*b*-4 and the write-back means 13*c*-4 have no setting information therein. The setting information storage means 13*d*-4 stores the setting information M4A, M4B and M4C.

Figure 8:
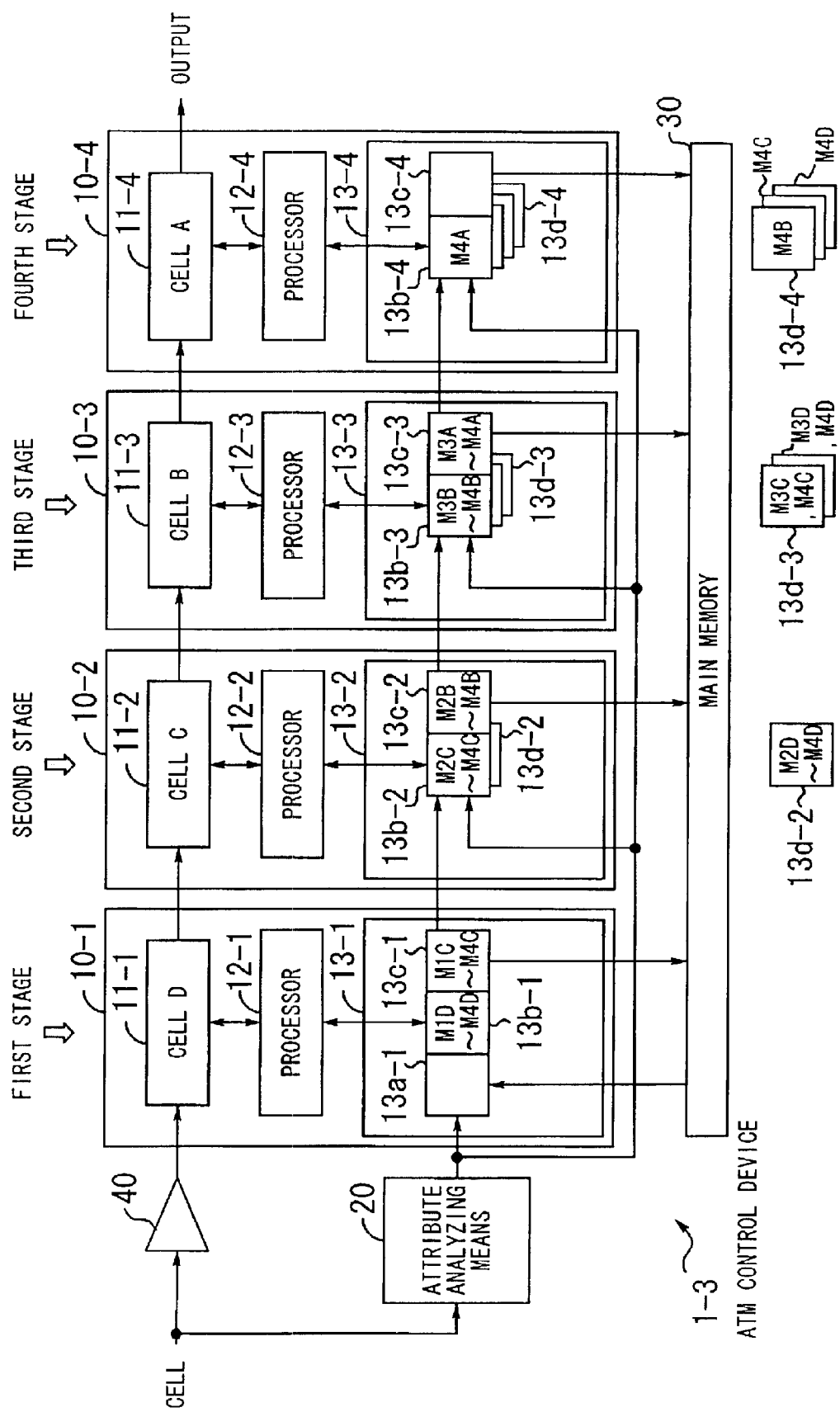
FIG. 8 is a diagram also illustrating the operation of the ATM control device according to the third embodiment.

FIG. 8 also illustrates the operation of the ATM control device according to the third embodiment, in which is shown the state at the time (t+1 stage processing time) In the first stage, the cell D is stored in the highway cache memory 11-1. The processor 12-1 performs the first-stage operation on the cell D stored in the highway cache memory 11-1, by using the setting information M1D stored in the operation information storage means 13*b*-1. The operation information storage means 13*b*-1 stores the result of operation. The result of operation on the cell D is also sent via the highway cache memory 11-1 to the next stage.

The write-back means 13*c*-1 writes the operation result M1C, which was obtained by the operation at the time t, back into the main memory 30 as the setting information. Also, the cell cache memory 13-1 sends the setting information M2D to M4D to the cell cache memory 13-2.

In the second stage, the cell C (which has already been subjected to operation in the first stage) is stored in the highway cache memory 11-2. Using the setting information M2C stored in the operation information storage means 13*b*-2, the processor 12-2 performs the second-stage operation on the cell C stored in the highway cache memory 11-2. The operation information storage means 13*b*-2 stores the result of operation. Also, the result of operation on the cell C is sent via the highway cache memory 11-2 to the succeeding stage.

The write-back means 13*c*-2 writes the operation result M2B, which was obtained by the operation at the time t, back into the main memory 30 as the setting information. Also, the setting information storage means 13*d*-2 stores the setting information M2D to M4D. Further, the cell cache memory 13-2 sends the setting information M3D and M4D to the cell cache memory 13-3.

In the third stage, the cell B (which has already been subjected to operation in the first and second stages) is stored in the highway cache memory 11-3. The processor 12-3 performs the third-stage operation on the cell B stored in the highway cache memory 11-3, by using the setting information M3B stored in the operation information storage means 13*b*-3. The operation information storage means 13*b*-3 stores the result of operation. Also, the result of operation on the cell B is sent via the highway cache memory 11-3 to the next stage.

The write-back means 13*c*-3 writes the operation result M3A, which was obtained by the operation at the time t, back into the main memory 30 as the setting information. Also, the setting information storage means 13*d*-3 stores the setting information M3C and M4C and the setting information M3D and M4D. Further, the cell cache memory 13-3 sends the setting information M4C and M4D to the cell cache memory 13-4.

In the fourth stage, the cell A (which has already been subjected to operation in the first, second and third stages) is stored in the highway cache memory 11-4. The processor 12-4 performs the fourth-stage operation on the cell A stored in the highway cache memory 11-4, by using the setting information M4A stored in the operation information storage means 13*b*-4. The operation information storage means 13*b*-4 stores the result of operation. Also, the result of final operation on the cell A is output via the highway cache memory 11-4.

At this point of time, the write-back means 13*c*-4 has no setting information to write back. The setting information storage means 13*d*-4 stores the setting information M4B, M4C and M4D.

As described above, the ATM control device 1-3 of the present invention is configured such that the necessary setting information is transmitted/received between the individual stages, and that in the first stage, the collective read process for the setting information, the process of the operation information storage means and the write-back process are performed, while in the second to Nth stages, the process of the operation information storage means and the write-back process are performed. Also, the cell cache memories are provided with the setting information storage means for storing the setting information transmitted/received between the stages.

This permits high-quality, high-efficiency control for speeding up the cell processing, making it possible to improve the throughput of the system.

Figure 9:
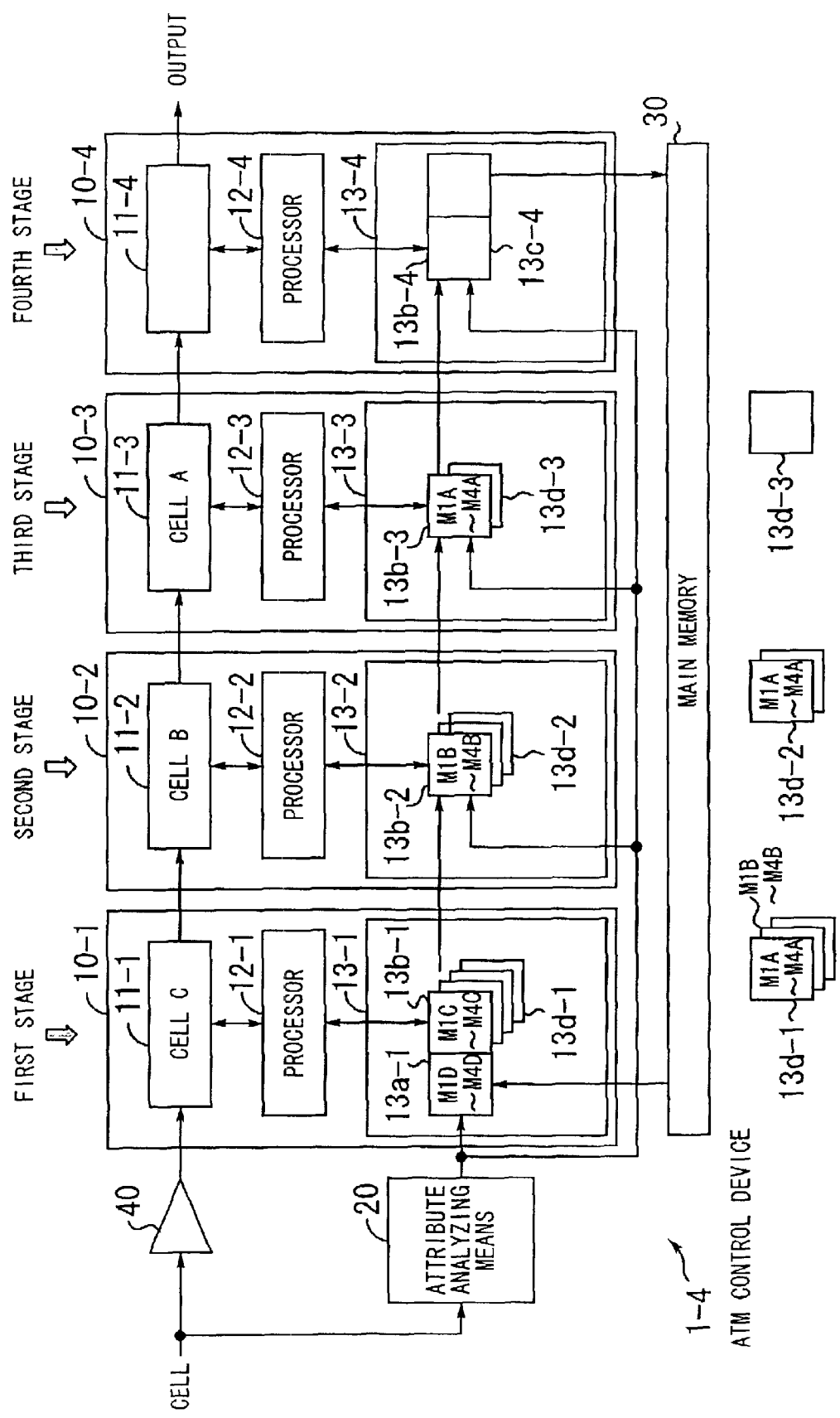
FIG. 9 is a diagram illustrating operation of an ATM control device according to a fourth embodiment.

An ATM control device according to a fourth embodiment will be now described. FIG. 9 illustrates operation of the ATM control device according to the fourth embodiment, in which is shown the state at time t.

Compared with the ATM control device 1-2 explained above with reference to FIGS. 5 and 6, the ATM control device 1-4 is configured such that the cell cache memory 13-1 includes no write-back means, that the cell cache memories 13-2 and 13-3 include neither the read means nor the write-back means, and that the cell cache memory 13-4 includes no read means. Also, the cell cache memories 13-1 to 13-3 include setting information storage means 13*d*-1 to 13*d*-3, respectively.

Operations of the individual stages will be now described. In the first stage, the cell C is stored in the highway cache memory 11-1. The processor 12-1 performs the first-stage operation on the cell C stored in the highway cache memory 11-1, by using the setting information M1C stored in the operation information storage means 13*b*-1. The operation information storage means 13*b*-1 stores the result of operation. The result of operation on the cell C is also sent via the highway cache memory 11-1 to the next stage.

The read means 13*a*-1 collectively reads the setting information M1D to M4D from the main memory 30. The setting information storage means 13*d*-1 holds the setting information M1A to M4A and the setting information M1B to M4B. Also, the cell cache memory 13-1 sends the setting information M1A to M4A to the cell cache memory 13-2.

In the second stage, the cell B (which has already been subjected to operation in the first stage) is stored in the highway cache memory 11-2. Using the setting information M2B stored in the operation information storage means 13*b*-2, the processor 12-2 performs the second-stage operation on the cell B stored in the highway cache memory 11-2. The operation information storage means 13*b*-2 stores the result of operation. Also, the result of operation on the cell B is sent via the highway cache memory 11-2 to the succeeding stage. The setting information storage means 13*d*-2 stores the setting information M1A to M4A.

In the third stage, the cell A (which has already been subjected to operation in the first and second stages) is stored in the highway cache memory 11-3. The processor 12-3 performs the third-stage operation on the cell A stored in the highway cache memory 11-3, by using the setting information M3A stored in the operation information storage means 13*b*-3. The operation information storage means 13*b*-3 stores the result of operation. Also, the result of operation on the cell A is sent via the highway cache memory 11-3 to the next stage. At this point of time, the setting information storage means 13*d*-3 has no setting information stored therein.

In the fourth stage, no cell has arrived at the highway cache memory 11-4 yet. At this point of time, the operation information storage means 13b-4 and the write-back means 13c-4 have no setting information therein.

Figure 10:
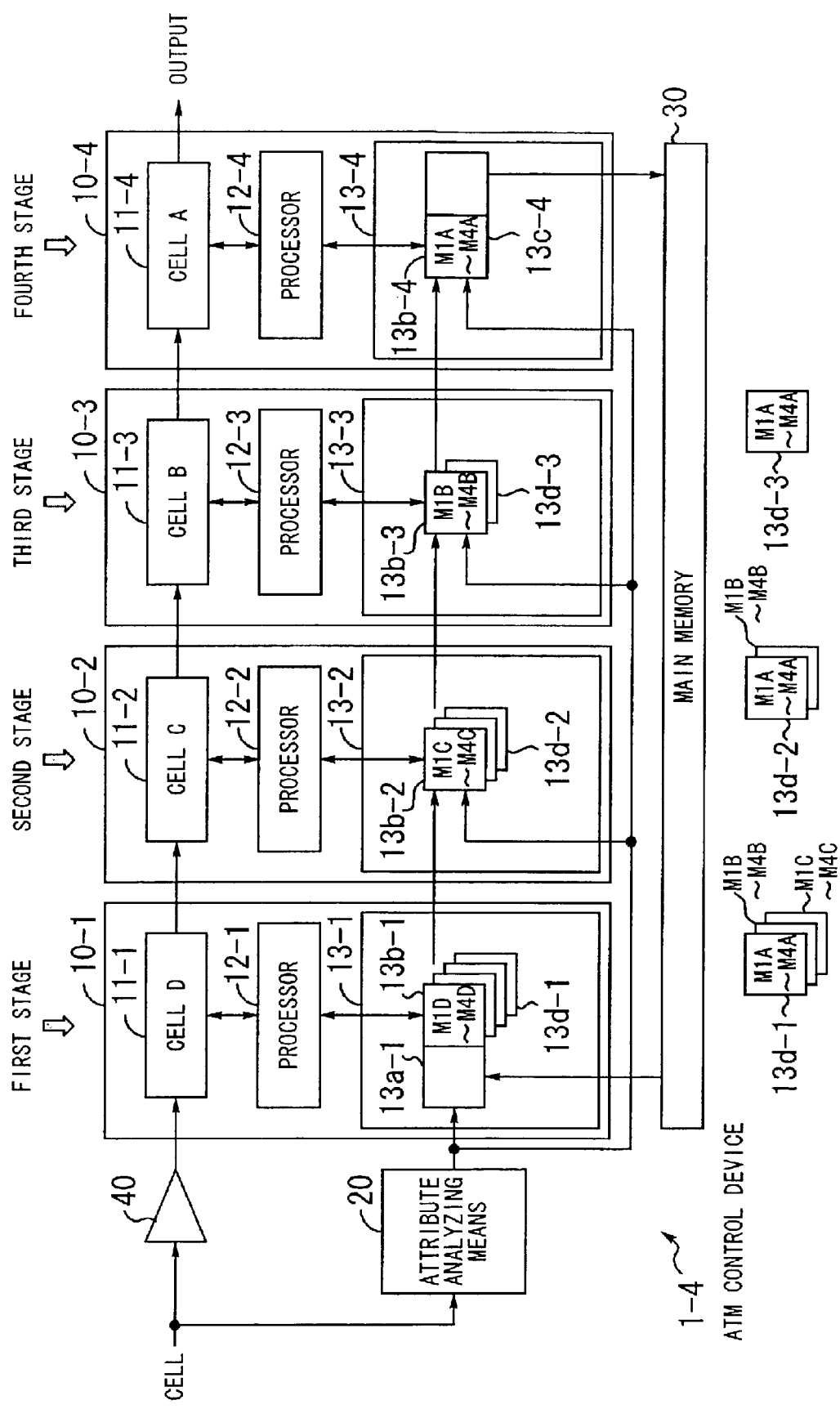
FIG. 10 is a diagram also illustrating the operation of the ATM control device according to the fourth embodiment.
Figure 11:
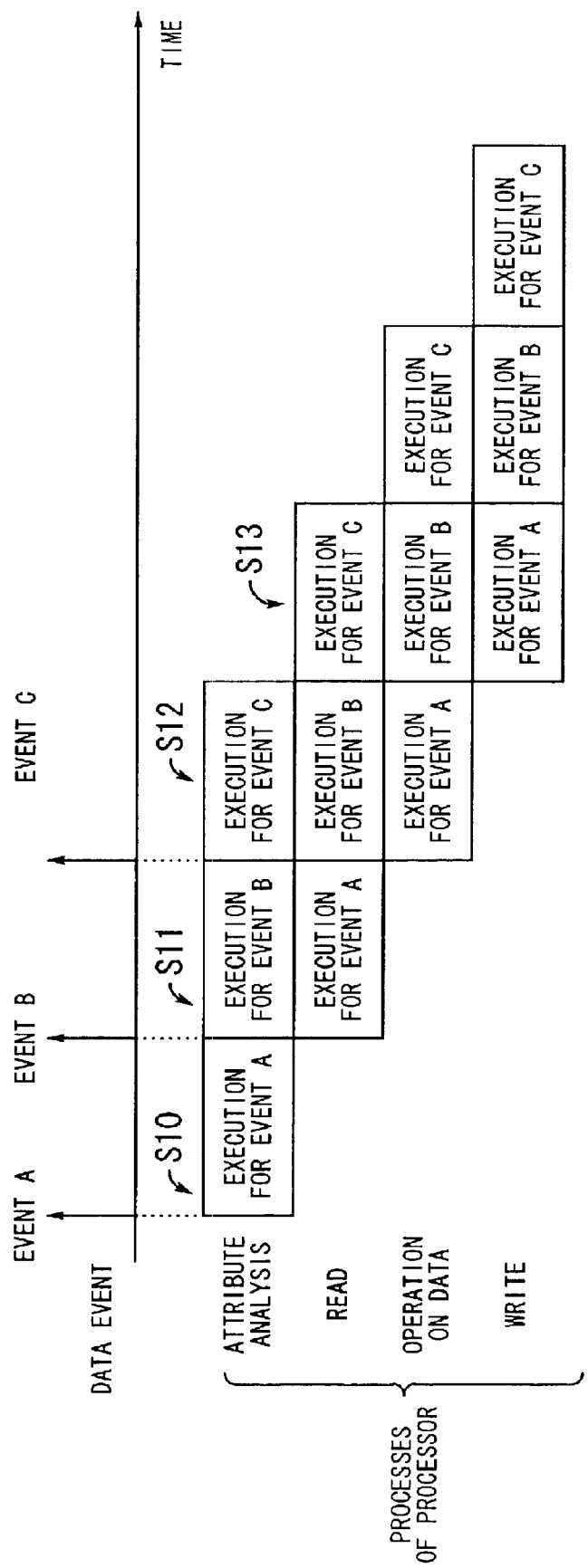
FIG. 11 is a diagram showing a flow of operations by means of a conventional pipeline.

FIG. 10 also illustrates the operation of the ATM control device according to the fourth embodiment, in which is shown the state at the time (t+1 stage processing time).

In the first stage, the cell D is stored in the highway cache memory 11-1. The processor 12-1 performs the first-stage operation on the cell D stored in the highway cache memory 11-1, by using the setting information M1D stored in the operation information storage means 13b-1. The operation information storage means 13b-1 stores the result of operation. The result of operation on the cell D is also sent via the highway cache memory 11-1 to the next stage.

The read means 13a-1 collectively reads, from the main memory 30, the setting information (e.g. M1E to M4E) necessary for the next process. The setting information storage means 13d-1 holds the setting information M1A to M4A, M1B to M4B, and M1C to M4C. Also, the cell cache memory 13-1 sends the setting information M1B to M4B to the cell cache memory 13-2.

In the second stage, the cell C (which has already been subjected to operation in the first stage) is stored in the highway cache memory 11-2. Using the setting information M2C stored in the operation information storage means 13b-2, the processor 12-2 performs the second-stage operation on the cell C stored in the highway cache memory 11-2. The operation information storage means 13b-2 stores the result of operation. Also, the result of operation on the cell C is sent via the highway cache memory 11-2 to the succeeding stage.

The setting information storage means 13d-2 stores the setting information M1A to M4A and M1B to M4B. Also, the cell cache memory 13-2 sends the setting information M1A to M4A to the cell cache memory 13-3.

In the third stage, the cell B (which has already been subjected to operation in the first and second stages) is stored in the highway cache memory 11-3. The processor 12-3 performs the third-stage operation on the cell B stored in the highway cache memory 11-3, by using the setting information M3B stored in the operation information storage means 13b-3. The operation information storage means 13b-3 stores the result of operation. Also, the result of operation on the cell B is sent via the highway cache memory 11-3 to the next stage.

The setting information storage means 13d-3 stores the setting information M1A to M4A. Also, the cell cache memory 13-3 sends the setting information M1A to M4A to the cell cache memory 13-4.

In the fourth stage, the cell A (which has already been subjected to operation in the first, second and third stages) is stored in the highway cache memory 11-4. The processor 12-4 performs the fourth-stage operation on the cell A stored in the highway cache memory 11-4, by using the setting information M4A stored in the operation information storage means 13b-4. The operation information storage means 13b-4 stores the result of operation. Also, the result of final operation on the cell A is output via the highway cache memory 11-4. At this point of time, the write-back means 13c-4 has no setting information to write back.

As described above, the ATM control device 1-4 of the present invention is configured such that the necessary setting information is transmitted/received between the individual stages. In addition, in the first stage, the collective read process for the setting information and the process of the operation information storage means are performed, in the second to (N−1)th stages, the process of the operation information storage means is performed, and in the Nth stage, the process of the operation information storage means and the write-back process are performed. Also, the cell cache memories are provided with the setting information storage means for storing the setting information transmitted/received between the stages.

This permits high-quality, high-efficiency control for speeding up the cell processing, making it possible to improve the throughput of the system.

In the foregoing description, the data control device 1 is applied to an ATM system, but it can also be applied to other communication systems (IP system etc.) than the ATM system.

As described above, the data control device according to the present invention is configured such that, after the attribute of data is analyzed, a plurality of data processing means each constituted by a highway cache memory, a processor and a data cache memory access the main memory storing the setting information, to subject the data to a plurality of stages of pipeline processing. This permits high-quality, high-efficiency control for speeding up data processing, making it possible to improve the throughput of the system.

Also, the ATM control device according to the present invention is configured such that, after the attribute of a cell is analyzed, a plurality of cell processing means each constituted by a highway cache memory, a processor and a cell cache memory access the main memory storing the setting information, to subject the cell to a plurality of stages of pipeline processing. This permits high-quality, high-efficiency control for speeding up cell processing, making it possible to improve the throughput of the ATM system.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A data control device for controlling operations on data, comprising:

attribute analyzing means for analyzing an attribute of data;

a main memory for storing setting information of the data in a region corresponding to the attribute; and a plurality of data processing means each including a highway cache memory for storing the data, said highway cache memory receiving and transmitting the data on a highway, a processor for performing an operation on the data in accordance with the setting information, and a data cache memory interposed between said processor and said main memory and storing the setting information, said plurality of data processing means subjecting the data to a plurality of stages of pipeline processing, wherein said data cache memory includes read means for reading the setting information from said main memory and storing the setting information, operation information storage means accessed by said processor and storing the setting information and a results of operation, and write-back means for writing the operation result back into said main memory as the setting information , and said read means, said operation information storage means and said write-back means perform parallel processing independently of one another.

2. The data control device according to claim 1, wherein, when an operation is performed at a time t in each of said plurality of stages, said data cache memory executes the process of said operation information storage means, the read process for the setting information to be subjected to an operation at a time (t+−1 stage processing time) and the write-back process for the setting information obtained by the operation at a time (t−1 stage processing rime) in parallel with one another.

3. The data control device according to claim 1, wherein, when an operation is performed at a time t in an Nth (N≧1) stage of said plurality of stages, said data cache memory of the Nth stage executes the process of said operation information storage means, the read process (or the setting information to be subjected to an operation at a tune (t+N stage processing times) and the write-back process for the setting information obtained by the operation at a time (t−1 stage processing time) in parallel with one another.

4. The data control device according to claim 3, wherein said data cache memory of an Nth (N≧2) stage of said plurality of stages includes setting information storage means, and when an operation is performed at the time t in the Nth stage, said setting information storage means stores the setting information to be subjected to an operation at a time (t+−1 stage processing time) through the setting information to be subjected to an operation at a time (t+(N−1) stage processing times).

5. The data control device according to claim 1, wherein said data cache memories of said plurality of stages transmit and receive the necessary setting information therebetween, said data cache memory of a first stage executes a collective read process for the setting information, the process of said operation information storage means and the write-back process, and said data cache memories of second to Nth stages execute the process of said operation information storage means and the write-back process.

6. The data control device according to claim 5, wherein said data cache memories of said plurality of stages include setting information storage means for storing the setting information transmitted/received therebetween.

7. The data control device according to claim 1, wherein said data cache memories of said plurality of stages transmit and receive the necessary setting information therebetween, said data cache memory of a first stage executes a collective read process for the setting information and the process of said operation information storage means, said data cache memories of second to (N−1)th stages execute the process of said operation information storage means, and said data cache memory of an Nth stage executes the process of said operation information storage means and the write-back process.

8. The data control device according to claim 7, wherein said data cache memories of said plurality of stages include setting information storage means for storing the setting information transmitted/received therebetween.

9. The data control device according to claim 1, wherein said main memory is provided for each of said plurality of stages independently of one another.

10. An ATM control device for controlling ATM communications, comprising:
attribute analyzing means for analyzing an attribute of a cell;
a main memory for storing setting information of the cell in a region corresponding to the attribute; and
a plurality of cell processing means each including a highway cache memory for storing the cell, said highway cache memory receiving and transmitting the cell on a highway, a processor for performing an operation on the cell in accordance with the setting information, and a cell cache memory interposed between said processor and said main memory and storing the setting information, said plurality of cell processing means subjecting the cell to a plurality of stages of pipeline processing,
wherein said cell cache memory includes read means for reading the setting information from said main memory and storing the setting information, operation information storage means accessed by said processor and storing the setting information and a result of operation, and write-back means for writing the operation result back into said main memory as the setting information, and
said read means, said operation information storage means and said write-back means perform parallel processing independently of one another.

11. The ATM control device according to claim 10, wherein, when an operation is performed at a time t in each of said plurality of stages, said cell cache memory executes the process of said operation information storage means, the read process for the setting information to be subjected to an operation at a time (t+1 stage processing time) and the write-back process for the setting information obtained by the operation at a time (t−1 stage processing Time) in parallel with one another.

12. The ATM control device according to claim 10, wherein, when an operation is performed at a time t in an Nth (N≧1) stage of said plurality of stages, said cell cache memory of the Nth stage executes the process of said operation information storage means, the read process for the setting information to be subjected to an operation at a time (t+N stage processing times) and the write-back process for the setting information obtained by the operation at a time (t−1 stage processing time) in parallel with one another.

13. The ATM control device according to claim 12, wherein said cell cache memory of an Nth (N≧2) stage of said plurality of stages includes setting information storage means, and when an operation is performed at the time t in the Nth stage, said setting information storage means stores the setting information to be subjected to an operation at a time (t+1 stage processing time) through the setting information to be subjected to an operation at a time (t+(N−1) stage processing times).

14. The ATM control device according to claim 10, wherein said cell cache memories of said plurality of stages Transmit and receive the necessary setting information therebetween, said cell cache memory of a first stage executes a collective read process for the setting information, the process of said operation information storage means and the write-back process, and said cell cache memories of second to Nth stages execute the process of said operation information storage means and the write-back process.

15. The ATM control device according to claim 14, wherein said cell cache memories of said plurality of stages include setting information storage means for storing the setting information transmitted/received therebetween.

16. The ATM control device according to claim 10, wherein said cell cache memories of said plurality of stages transmit and receive the necessary setting information therebetween, said cell cache memory of a first stage executes a collective read process for the setting information and the process of said operation information storage means, said cell cache memories of second to (N−1)th stages execute the process of said operation information storage means, and said cell cache memory of an Nth stage executes the process of said operation information storage means and the write-back process.

17. The ATM control device according to claim 16, wherein said cell cache memories of said plurality of stages include setting information storage means for storing the setting information transmitting/received therebetween.

18. The ATM control device according to claim 10, wherein said main memory is provided fog each of said plurality of stages independently of one another.

* * * * *